(12) United States Patent
Wang

(10) Patent No.: US 9,616,344 B2
(45) Date of Patent: Apr. 11, 2017

(54) TWO-DIMENSIONAL DATABASE QUERY

(71) Applicant: ELECTRONIC ARTS INC., Redwood City, CA (US)

(72) Inventor: Wei Wang, Redwood City, CA (US)

(73) Assignee: Electronic Arts Inc., Redwood City, CA (US)

(*) Notice: Subject to any disclaimer, the term of this patent is extended or adjusted under 35 U.S.C. 154(b) by 256 days.

(21) Appl. No.: 14/231,294

(22) Filed: Mar. 31, 2014

(65) Prior Publication Data

US 2015/0278357 A1   Oct. 1, 2015

(51) Int. Cl.
    *G06F 17/30* (2006.01)
    *A63F 13/79* (2014.01)
    *A63F 13/00* (2014.01)
    *G06Q 10/00* (2012.01)

(52) U.S. Cl.
    CPC .............. *A63F 13/79* (2014.09); *A63F 13/00* (2013.01); *G06Q 10/00* (2013.01)

(58) Field of Classification Search
    CPC ......... G06F 17/30312; G06F 17/30592; G06F 17/30864
    See application file for complete search history.

(56) References Cited

U.S. PATENT DOCUMENTS

| | | | | |
|---|---|---|---|---|
| 2008/0225738 A1* | 9/2008 | Virdhagriswaran | .. | G06F 11/079 370/252 |
| 2013/0103657 A1* | 4/2013 | Ikawa | ............... | G06F 17/30985 707/693 |
| 2013/0331174 A1* | 12/2013 | Thacker | .............. | G07F 17/3244 463/22 |
| 2014/0229470 A1* | 8/2014 | Smith-Mickelson | | G06F 17/3053 707/725 |
| 2014/0359771 A1* | 12/2014 | Dash | ................... | H04L 63/1408 726/23 |
| 2015/0006715 A1* | 1/2015 | Diehl | .................... | H04L 43/045 709/224 |

OTHER PUBLICATIONS

Luu, H. et al. (Jun. 2013) "LinkedIn Segmentation & Targeting Platform: A Big Data Application", 37 pages.

* cited by examiner

*Primary Examiner* — Alexander Khong
(74) *Attorney, Agent, or Firm* — Lowenstein Sandler LLP

(57) ABSTRACT

A data structure includes a plurality of player entries that associates a player with a respective set of player activity data points having a first value and a second value. In response to a query defining ranges for the first value and second value, a response is generated using the data structure, the response indicating players matching the criteria of the ranges.

14 Claims, 8 Drawing Sheets

TWO-DIMENSIONAL DATABASE QUERY

TECHNICAL FIELD

Embodiments of the present invention relate to querying a data structure.

DESCRIPTION OF THE RELATED ART

Responding to a query of a database of tracked user activity may be slow if the amount of user activity becomes large or if the query is complex.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods for responding to a query of a data structure. The data structure may, for example, comprise data regarding user activity for a plurality of users. The data structure may, for example, comprise a list of user identifiers, each user identifier associated with a set of data points and each of the set of data points indicating a time and an amount of activity associated with time. For example, one element of the list may indicate that a first user played a particular game three times in January, once in March, and once in May. A second element of the list may indicate that a second user played the particular game once in February and once in March. A third element of the list may indicate that a third user played the particular game once in February, twice in April, and three times in August. Such a data structure is both highly scalable and highly responsive.

The query may be a two-dimensional query that specifies a time window and an amount window. The response to the query may include an indication of those users having, within the time window, a total amount of activity within the amount window. For example, a query may request an indication of those users who have played the game at least twice between January and March. Using the example above, the response would indicate the first user and the second user, but not the third user. A second query may request an indication of the users who have played the game at least three times between January and April. Again using the example above, the response would indicate the first user and the third user, but not the second user. Thus, the query may have dynamically quantified predicates, allowing the time window and the amount window to be defined independently from the configuration of the data structure.

Figure 1:
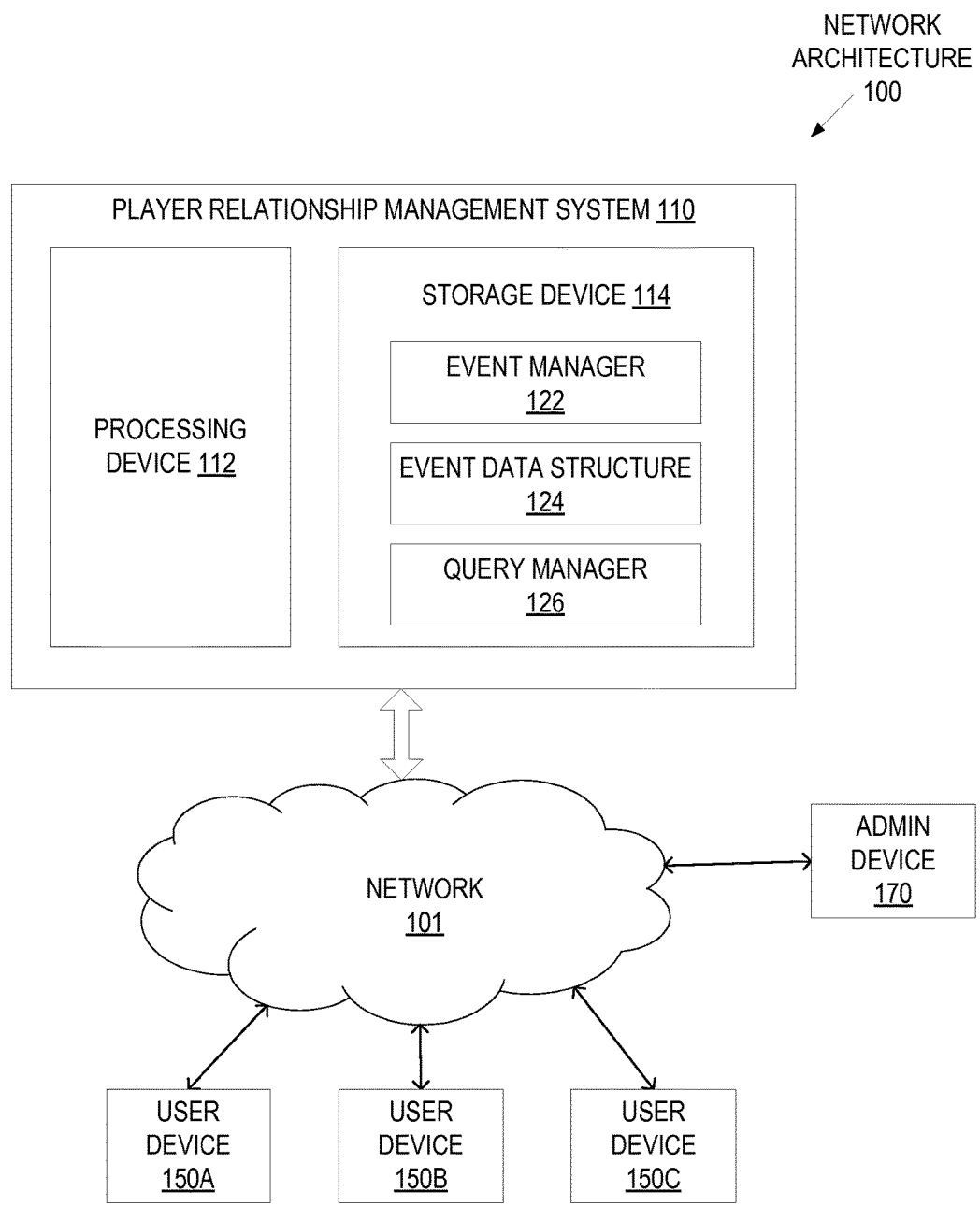
FIG. 1 is a block diagram of an embodiment of a network architecture in which implementations of the present disclosure can operate.

FIG. 1 is a block diagram of an embodiment of a network architecture 100. The network architecture 100 includes a player relationship management (PRM) system 110 coupled to a network 101. A number of user devices 150A-150C are also coupled to the network 101 and the PRM system 110 may receive data about user activity from the user devices 150A-150C over the network 101. An admin device 170 is also coupled to the network 101 and the admin device 170 may submit queries to the PRM system 110 and receive responses to the queries from the PRM system 110 over the network 101. Although only three user devices 150A-150C and a single admin device 170 are illustrated in FIG. 1, it is to be appreciated that the network architecture 100 may include any number of user devices or admin devices.

The PRM system 110 includes a processing device 112 and a storage device 114. The storage device 114 may store an event manager 122. The event manager 122 may include instructions, executable by the processing device 112, for processing event data regarding user activities. The event manager 122 may include instructions for receiving event data over the network 101, processing the event data, and storing the event data in an event data structure 124 stored in the storage device 114. The event manager 122 may include additional instructions for performing additional functions.

The event manager 122 may further include instructions for maintaining the event data structure. For example, the event manager 122 may periodically compress the event data structure to save space in the storage device 114. In one embodiment, the event manager 122 reduces the temporal granularity of event data as it ages. For example, for recent event data, the event data structure 114 may include event data points specifying an amount of activity that occurred in a single day, week, or month, but, for older event data, include event data points specifying an amount of activity in a month, year, or historically (e.g., all activity before a specified date). The event manager 122 may reduce the size of the event data structure 124 in other ways, such as by removing data associated with inactive users or data compression techniques.

The storage device 114 may also store a query manager 126. The query manager 126 may include instructions, executable by the processing device 122, for receiving and responding to queries. The query manager 126 may include instructions for receiving a query from an admin device 170 over the network 101, searching the event data structure 124 stored in the storage device 114, generating a response to the query based on the search, and sending the response to the admin device 170 over the network 101. The query manager 126 may include additional instructions for performing additional functions.

Figure 2:
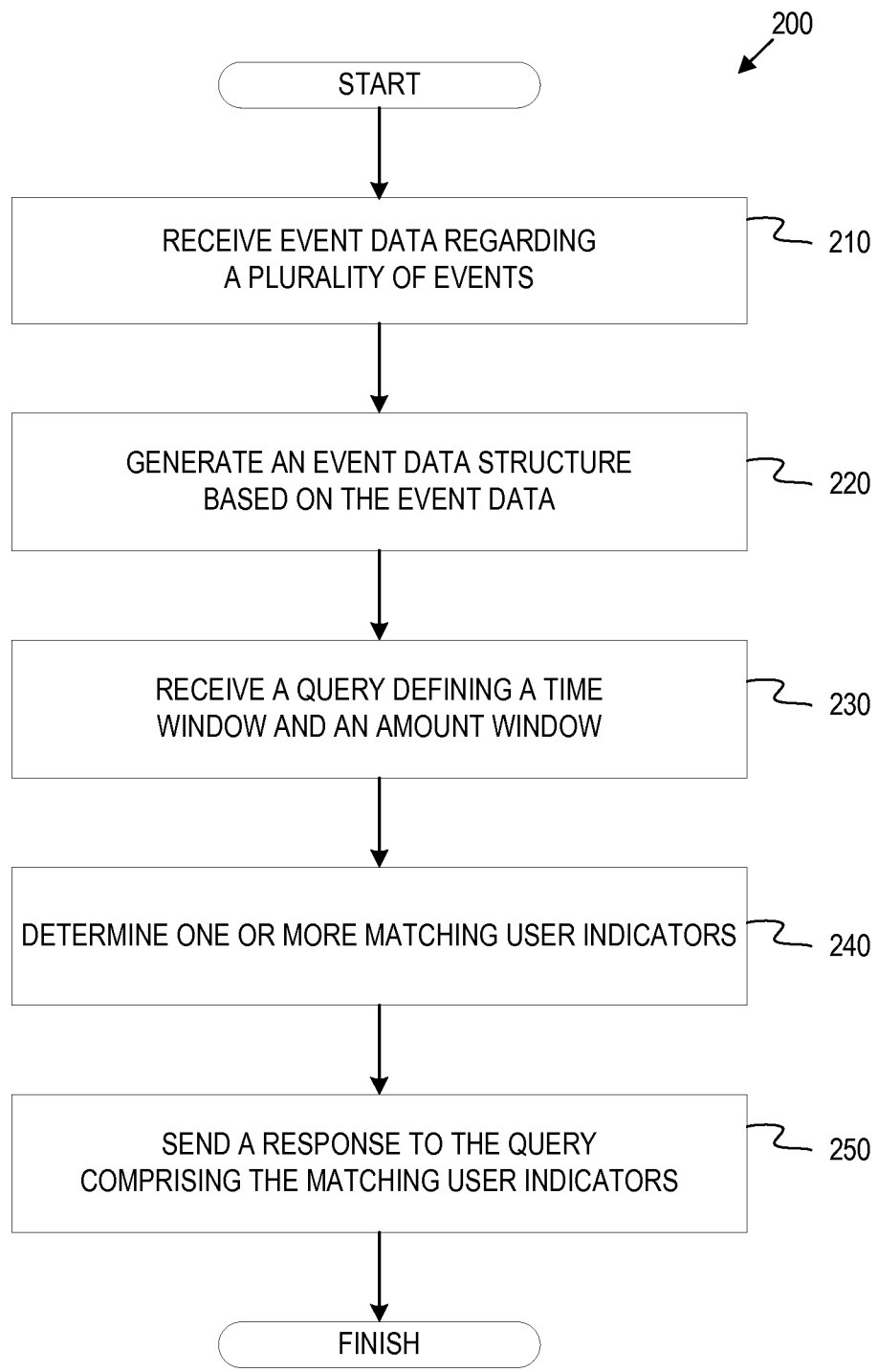
FIG. 2 is a flow diagram of an embodiment of a method of responding to a query.

FIG. 2 is a flow diagram of an embodiment of a method 200 of responding to a query. The method 200 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 200 may be performed, at least in part, by processing logic of the PRM system 110 described above with respect to FIG. 1. In particular, the method 200 may be performed by processing logic of the event manager 122 and the query manager 126 of FIG. 1.

It is to be appreciated that the method 200 may be performed by a PRM system for any number of queries simultaneously, concurrently (partially overlapping in time), or consecutively. However, for ease of reference, the method 200 is described for a single query.

At block 210 of method 200, the processing logic receives event data regarding a plurality of events. The event data includes, for each of the plurality of events, an indication of a user associated with the event, a time associated with the event, and an amount associated with the event. The event may be indicative of user activity. For example, the event data may indicate that a first user, during the month of July, three times, played a particular game on a user device. As another example, the event data may indicate that a second user, during 2014, spent $314.15 on in-app purchases. As a further example, the event data may indicate that a third user, on a particular date (e.g., Feb. 12, 2012) slept 7.5 hours. As yet another example, the event data may indicate that a fourth user, at a particular time (e.g., Nov. 29, 2013 at 11:30 am), lifted 405 pounds. As another example, the event data may indicate that a fifth user, at a yearly physical, had a resting heart rate of 68 beats per minute. It is to be appreciated that the event data may include other types of activities or include other types of data about a user.

Figure 3:
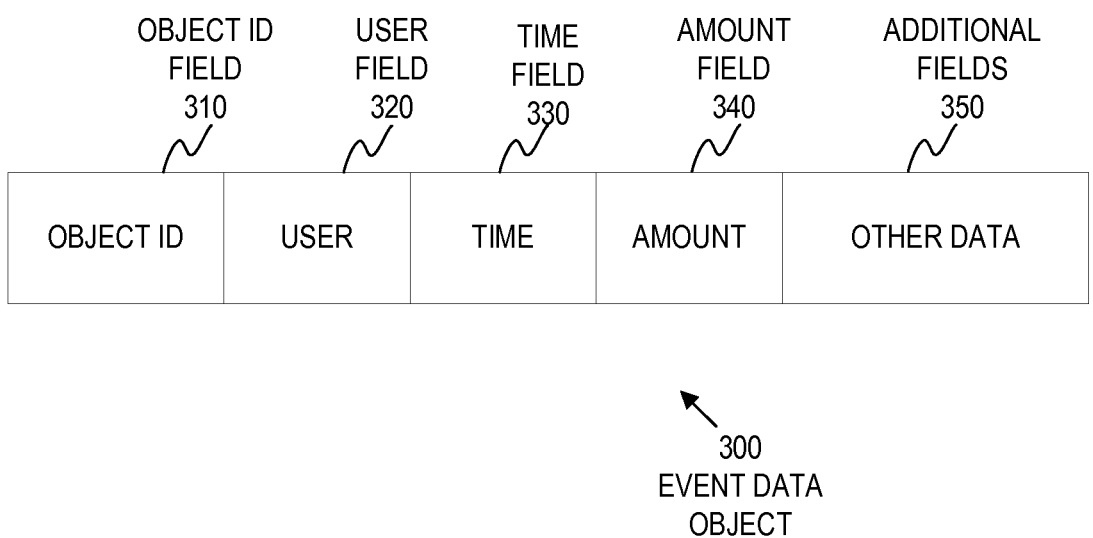
FIG. 3 is a block diagram of an embodiment of an event data object.
Figure 4:
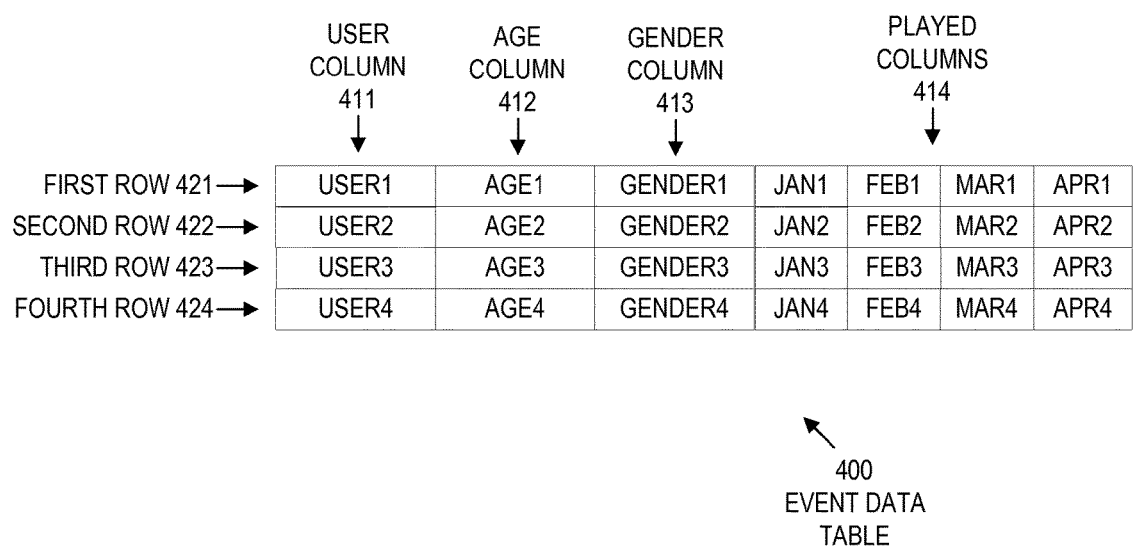
FIG. 4 is a block diagram of an embodiment of a table comprising a plurality of event data objects.

The event data may include any of a number of different data structures. The event data may include one or more event data objects, each associated with a single event. FIG. 3 is a block diagram of an embodiment of an event data object 300 and is described further below. The event data may include one or more event data tables, each associated with a plurality of events. FIG. 4 is a block diagram of an embodiment of an event data table 400 and is also described further below. The event data may include other types of data structures.

The event data object 300 of FIG. 3 includes a number of different fields. The event data object 300 includes an object identifier field 310 that includes a unique identifier of the object that also serves to uniquely identify an event described by the event data object 300. The event data object 300 includes a user field 320 that includes a user indicator that indicates a user associated with the event. The user indicator may be a user identifier number associated with the user or a username associated with the user.

The event data object 300 includes a time field 330 that indicates a time associated with the event. The indicated time may be a year, month, day, hour, minute, second, or any other time or period of time. The event data object 300 includes an amount field 340 that indicates an amount associated with the event. The amount may be any number. In one embodiment, the event data object 300 does not include an amount field 340, but implicitly indicates an amount. For example, an event data object 300 excluding an amount field 340 may implicitly indicate an amount associated with the event of one. For example, the event data object 300 may explicitly indicate that event occurred at a particular time and implicitly indicate that the event occurred one time. The event data object 300 may include additional fields 350 that include other data. The other data may include, for example, a set of player data comprising one or more of an age indicator indicating an age of the player, a gender indicator indicating a gender of the player, a country indicator indicating a country of the player, or a username indicator indicating a username of the player.

The event data table 400 of FIG. 4 includes a number of columns 411-414 and a number of rows 421-424 indicating a number of events that have occurred. The example event data table 400 illustrated in FIG. 4 indicates a number of times users have played a particular game during particular months. It is to be appreciated that other event data tables may provide data regarding different events.

The event data table 400 includes a number of rows 421-424, each associated with a different user, as indicated in a user column 411. In each row 421-424 in the user column 411, the event data table 400 includes a user indicator indicating a particular user. In each row 421-424, in the age column 412, the event data table 400 includes an age indicator indicating an age of the user indicated by the user indicator in the user column 411. Similarly, the gender column 413 includes a gender indicator indicating a gender of the user indicated by the user indicator in the user column 411. It is to be appreciated that the event data table 400 may include additional, not shown, columns including other kinds of data.

The event data table 400 includes, for each row 421-424, a number of played columns 414 indicating a number of times the user indicated in the user column 411 has played a particular game during a particular month. For example, in the first row 421, the played columns 414 may indicate that the user associated with the user indicator USER1 has played the particular game two times in January (e.g., JAN1=2), zero times in February (e.g., FEB1=0), zero times in March (e.g., MAR1=0), and one time in April (e.g., APR1=1).

Returning to FIG. 2, at block 220, the processing logic generates an event data structure based on the event data. Generating the event data structure based on the event data may include modifying an existing event data structure to include the events indicated by the event data. The event data structure associates each of a plurality of user indicators with a respective set of event data points. Each of the event data points comprises a pairing of a time indicator indicating a time associated with an event and an amount indicator indicating an amount associated with the event.

Figure 5:
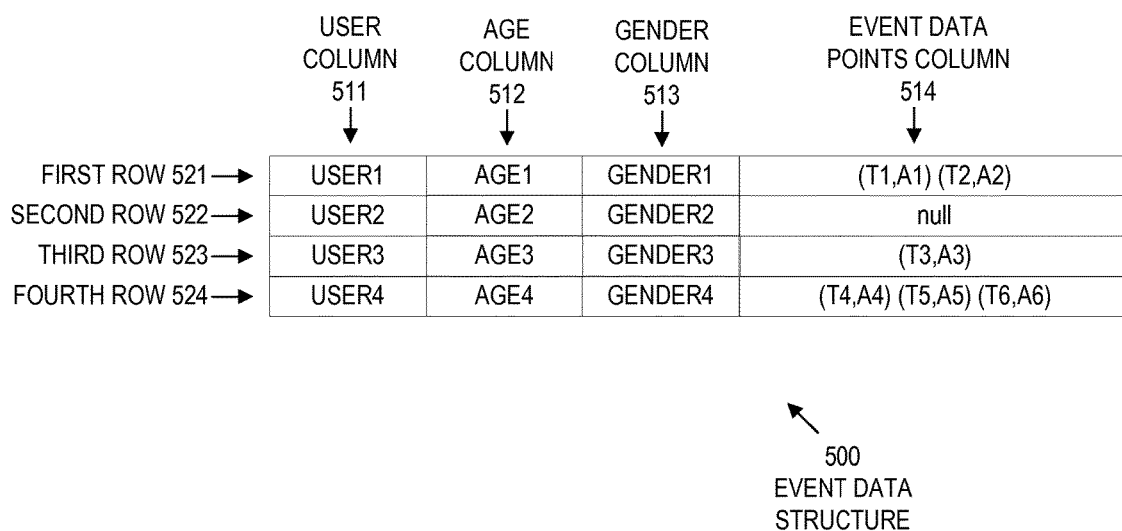
FIG. 5 is a block diagram of an embodiment of an event data structure.

FIG. 5 is a block diagram of an embodiment of an event data structure 500. The event data structure 500 of FIG. 5 includes a number of rows 521-524 and a number of columns 511-514, including an event data points column 514 that includes, for each row 521-524, a set of event data points. The example event data structure 500 illustrated in FIG. 5 (like the event data table 400 of FIG. 4) indicates a number of times users have played a particular game during particular months. It is to be appreciated that other event data tables may provide data regarding different events. Further, although illustrated as a two-dimensional structure, it is to be appreciated that the event data structure 500 may take other shapes and forms in which user indicators are associated with sets of event data points.

The event data structure 500 includes a number of rows 521-524, each associated with a different user, as indicated in a user column 511. In each row 521-524 in the user column 511, the event data structure 500 includes a user indicator indicating a particular user. In each row 521-524, in the age column 512, the event data table 500 includes an age indicator indicating an age of the user indicated by the user indicator in the user column 511. Similarly, the gender column 513 includes a gender indicator indicating a gender of the user indicated by the user indicator in the user column 511. It is to be appreciated that the event data structure 500 may include additional columns including other kinds of data.

The event data structure 500 includes, for each row 521-524, an event data points column 514 including a set of event data points. The set of event data points may be a null set including zero event data points (as illustrated in the second row 522). The set of event data points may include a single event data point (as illustrated in the third row 523). The set of event data points may include a plurality of event data points (as illustrated in the first row 521 and the fourth row 524).

Each of the event data points includes a pairing of a time indicator and an amount indicator. Thus, if USER1 has played the particular game two times in January, zero times in February, zero times in March, and one time in April, the set of event data points may include a first point indicating (January, 2) and a second point indicating (April, 1).

It is to be appreciated that the event data structure 500 of FIG. 5 is different from the event data table 400 of FIG. 4. Whereas the event data table 400 of FIG. 4 includes a number of played columns 414 for a particular game, the event data structure 500 of FIG. 5 includes a single event data points column 514 for a particular game.

Thus, if USER1 has played the particular game two times in January, zero times in February, zero times in March, and one time in April, the event data table 400 of FIG. 4 may include four played columns indicating (2, 0, 0, 1), whereas the event data structure 500 of FIG. 5 may include a set of event data points indicating (January, 2) and (April, 1).

Similarly, if USER2 has not played the particular game in January, February, March, or April, the event data table 400 of FIG. 4 may include four played columns indicating (0, 0, 0, 0), whereas the event data structure 500 of FIG. 5 may associate USER2 with a null set.

Because the event data structure 500 only includes event data points with particular events that have occurred, the event data structure 500 of FIG. 5 is more data space efficient than the event data table 400 of FIG. 4. For example, if a user had no activity over a particular time period, no memory or disk space is allocated to store this information.

The event data structure 500 may include additional space saving features. In one embodiment, time values are encoded with a time offset value instead of an absolute time value in order to save space. In another embodiment, different time ranges have different temporal granularity. For example, a set of event data points may indicate that a user played a game seven times in 2011, six times in 2012, once in March 2013, twice in April 2013, and once in August 2013. Thus, in earlier years, the temporal granularity is a full year, whereas in more recent years, the temporal granularity is monthly.

Returning to FIG. 2, at block 230, the processing logic receives a query defining a time window and an amount window. The time window may include both a start time and a stop time. The time window may include only one of a start time or a stop time. The time window may indicate a time period, e.g., a day, month, or year. The amount window may include both a minimum amount and a maximum amount. The amount window may include only one of a minimum amount and a maximum amount. The time window and amount window may be indicated in other ways.

The query may request a list of user indicators of users matching the criteria specified by the time window and amount window. For example, the query may request a list of user indicators indicating users that have played a particular game at least a threshold number of times within the time window. For example, the query may request a list of user indicators indicating users that have played a particular game at least five times in January. Thus, the time window is between January 1 and January 31 and the amount window is 5 and above (e.g., between 5 and infinity). As another example, the query may request a list of user indicators indicating users that have spent more than a threshold amount of money within the time window.

The query may further define additional criteria to be matched by the users. For example, the query may define user data criteria such as an age of the user, a gender of the user, a country of the user, or a username of the user. For example, the query may request a list of user indicators indicating users that are under twenty, female, and who have played a particular game at least once within the last forty days.

At block 240, the processing logic uses the event data structure generated in block 220 to determine one or more matching user indicators based on the time window and amount window specified in the query. The processing logic may further determine the matching user indicators based on additional criteria specified by the query.

In one embodiment, the matching user indicators are determined such that each of the matching user indicators is associated by the event data structure with a respective set of event data points having a subset of data points wherein each of the subset of data points comprises a time indicator indicating a time within the time window and wherein the subset of data points comprises a set of amount indicators indicating a set of amounts having a sum within the amount window.

At block 250, the processing logic sends a response to the query comprising the matching user indicators.

Figure 6:
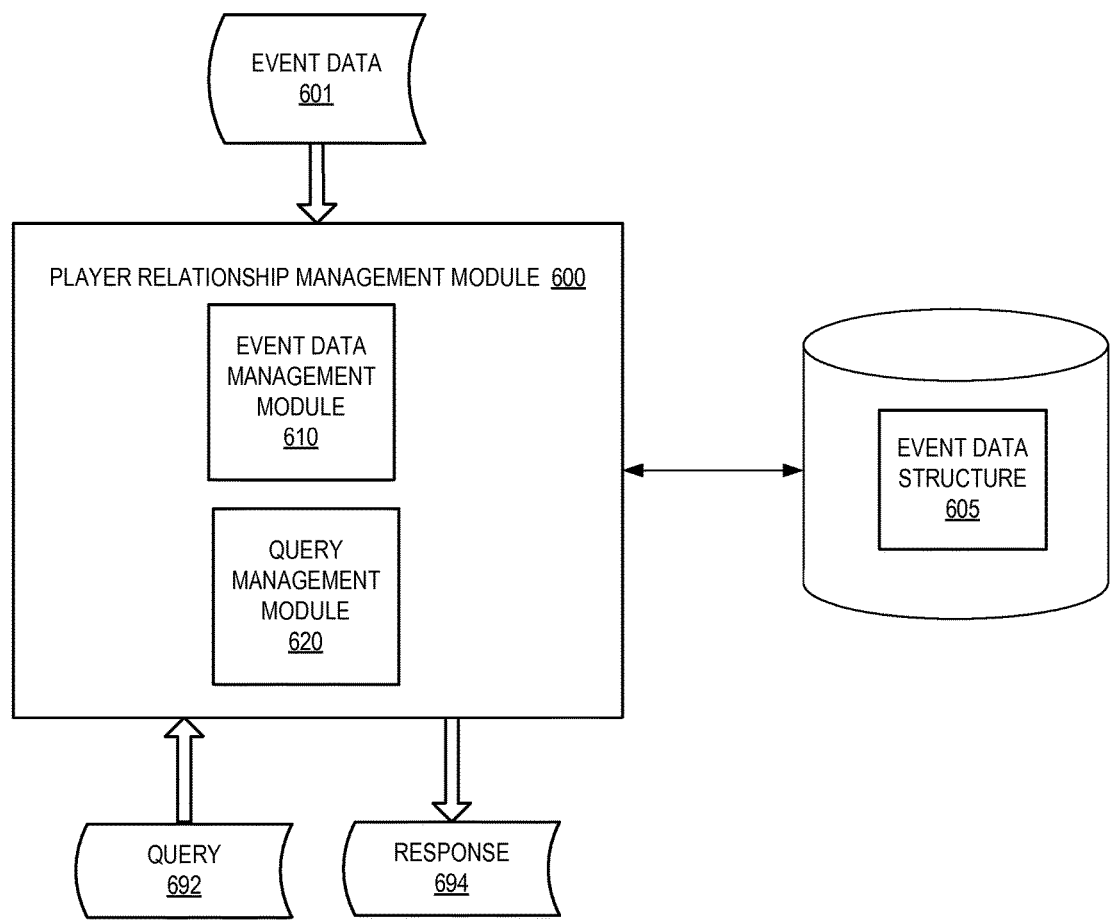
FIG. 6 is a block diagram of an embodiment of a player relationship management module.

FIG. 6 is a block diagram of an embodiment of a player relationship management (PRM) module 600. The PRM module 600 may be executed by the processing device 112 of the PRM system 110 of FIG. 1. The PRM module 600 takes, as input, event data 601 and, based on the event data 601, generates or modifies an event data structure 605 stored in a database, memory, or other storage device. The PRM module 600 also takes, as input, a query 692 and provides, as output, a response 694 to the query 692 based on information in the event data structure 605.

The PRM module 600 includes an event data management module 610 that parses received event data 601 and generates or modifies the event data structure 605 to include the information of the received event data. The PRM module 600 includes a query management module 620 that receives the query 692 and provides the response 694.

Figure 7:
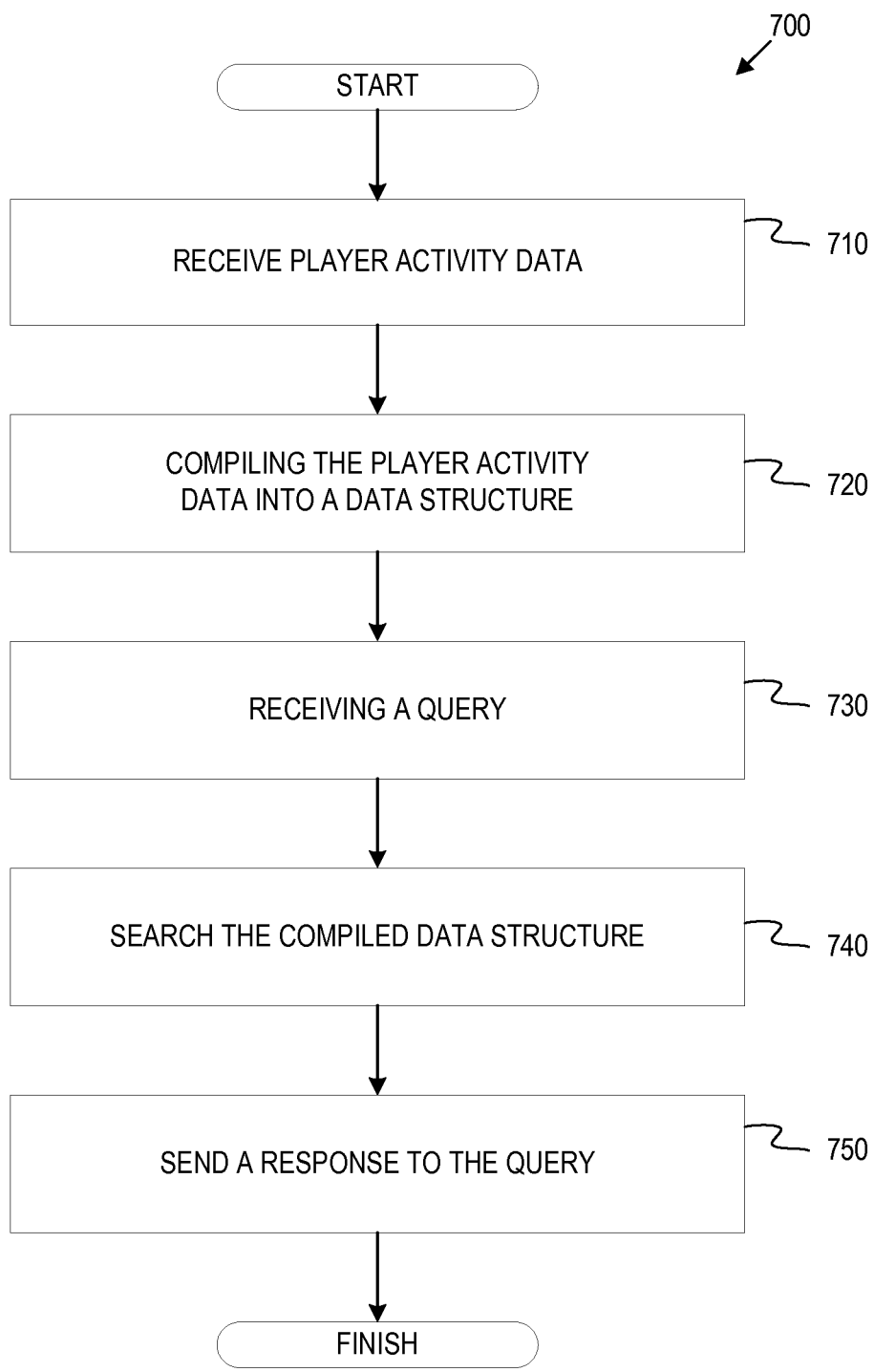
FIG. 7 is a flow diagram of an embodiment of a method of searching a data structure.

FIG. 7 is a flow diagram of an embodiment of a method 700 of searching a data structure. The method 700 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 700 may be performed, at least in part, by processing logic of the PRM system 110 described above with respect to FIG. 1. In particular, the method 700 may be performed by processing logic of the event manager 122 and the query manager 126 of FIG. 1.

It is to be appreciated that the method 700 may be performed by a PRM system for any number of queries simultaneously, concurrently (partially overlapping in time), or consecutively. However, for ease of reference, the method 700 is described for a single query.

At block 710 of method 700, the processing logic receives player activity data. The player activity data may be similar to the event data described above. The player activity data may include, for each of a number of player activities, an indication of a player associated with the activity, a first value associated with the activity, and a second value associated with the activity. In one embodiment, the first value is a time and the second value is an amount.

For example, the player activity data may indicate that a first player, during the month of July, three times, played a particular game on a user device. As another example, the player activity data may indicate that a second user, during 2014, spent $314.15 on in-app purchases. It is to be appreciated that the player activity data may include other types of activities or include other types of data about a player.

At block 720, the processing logic compiles the player activity data into a data structure. Compiling the player activity data into a data structure may include modifying an existing data structure to include the player activity indicated by the player activity data. The data structure comprises a plurality of player entries associating a player with a set of activity data points. Each of the activity data points comprises a pairing of a first value associated with an activity and a corresponding second value associated with the activity. In one embodiment, the first value indicates a time a player has played a particular game and the second value indicates an amount the player has played the particular game during the time.

In one embodiment, the data structure is the event data structure 500 of FIG. 5. Thus, the data structure may associate players with a set of player data comprising one or more of an age indicator indicating an age of the player, a gender indicator indicating a gender of the player, a country indicator indicating a country of the player, or a username indicator indicating a username of the player.

It is to be appreciated, as described above and illustrated in the event data structure 500 of FIG. 5, that the set of activity data points may include zero, one, or a plurality of data points. In particular, the set of activity data points may be the null set. Thus, the data structure may include a first player entry associating a first player with a first set of activity data points comprising zero activity data points, a second player entry associating a second player with a second set of activity data points comprising only a single activity data point, and a third player entry associating a third player with a third set of activity data points comprising a plurality of activity data points.

At block 730, the processing logic receives a query. The query may be received after the player activity data is compiled into the data structure. The query may specify a first range for the first value and a second range for the second value. For example, the first range may be a time window and the second range may be threshold.

At block 740, the processing logic searches the compiled data structure based on the first range and second range. In particular, the processing logic searches the compiled data structure to determine a player (or more than one player) associated by the data structure with a subset of activity data points having first values in the first range and having second values with a sum or other function (e.g., a dynamically computed result) in the second range. For example, where the first range is a time window and the second range is a threshold, searching may determine a player having at least the threshold amount of activity within the time window. As a further example, the threshold amount of activity may be at least once and the time window may be a recent time period to determine a player that performed the activity recently (e.g., within the last few days, within the last couple of months, within the current year, etc.).

The processing logic searches the compiled data structure to find player entries associated with a set of activity data points matching criteria specified by the query. For each set of activity data points, there exists a first-range-matching subset of activity data points (which may include zero, one, or a plurality of activity data points) having first values within the first range. The first-range-matching subset may include each of the activity data points having first values in the first range. If the sum of the second values of the first-range-matching subset is within the second range, it may be determined that the player entry matches the criteria specified by the query.

At block 750, the processing logic sends a response to the query. The response may indicate one or more players that match the criteria specified by the query.

Figure 8:
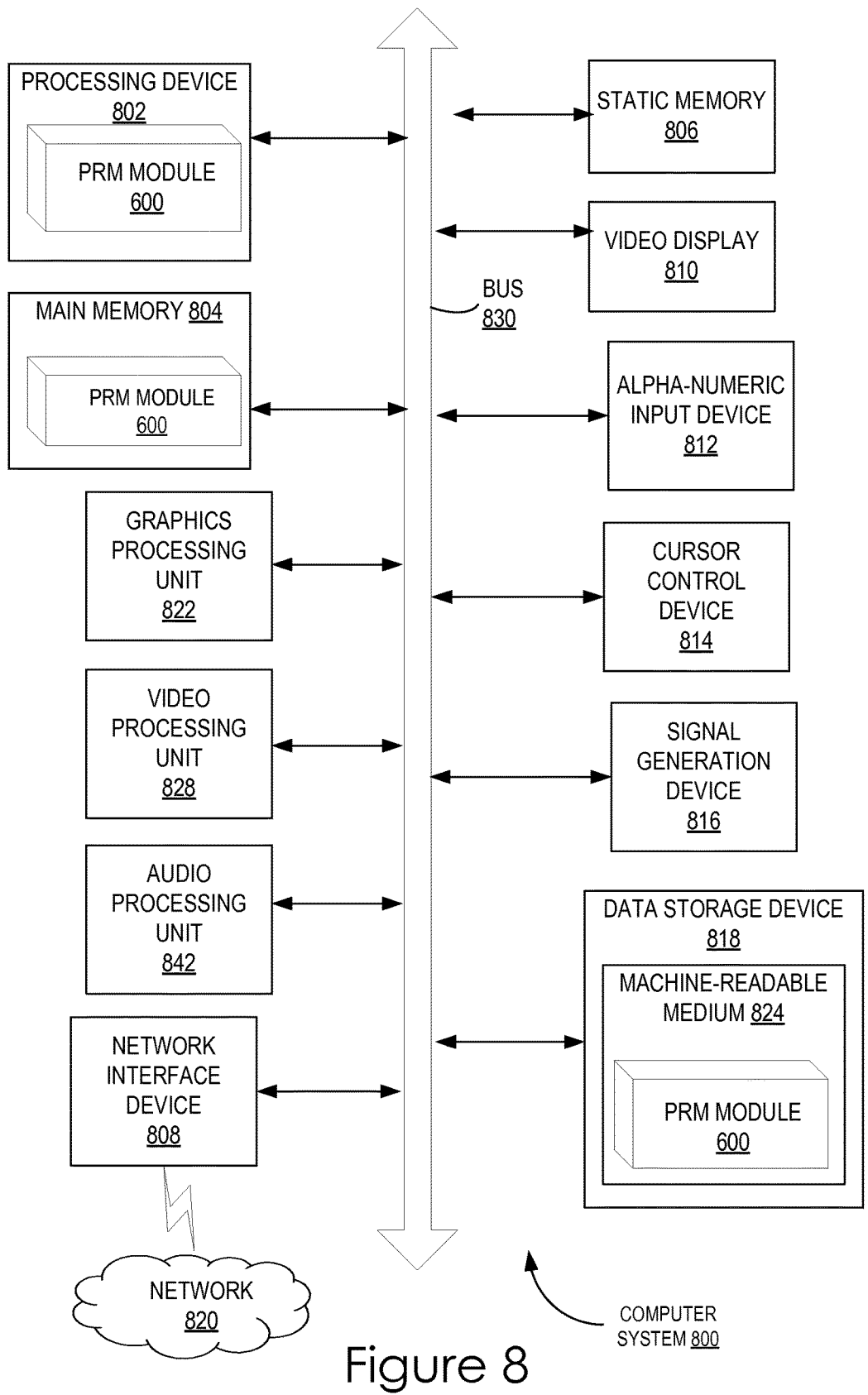
FIG. 8 is a block diagram of an embodiment of a computer system.

FIG. 8 illustrates a diagrammatic representation of a machine in the example form of a computer system 800 within which a set of instructions, for causing the machine to perform any one or more of the methodologies discussed herein, may be executed. The computer system 800 may represent at least one of the PRM system 110, user devices 150A-150C, or admin device 170 of FIG. 1. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the PRM module 600 (as discussed in conjunction with FIG. 6) may be included in the execution block processing device 802.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In one embodiment, processing device 802 may include one or processing cores. The processing device 802 is configured to execute the instructions of processing logic for performing the operations discussed herein, such as instructions for executing the PRM module 600 of FIG. 6.

The computer system 800 may further include a network interface device 808 communicably coupled to a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a signal generation device 816 (e.g., a speaker), or other peripheral devices. Furthermore, computer system 800 may include a graphics processing unit 822, a video processing unit 828, and an audio processing unit 832. In another embodiment, the computer system 800 may include a chipset (not illustrated), which refers to a group of integrated circuits, or chips, that are designed to work with the processing device 802 and controls communications between the processing device 802 and external devices. For example, the chipset may be a set of chips on a motherboard that links the processing device 802 to very high-speed devices, such as main memory 804 and graphic controllers, as well as linking the processing device 802 to lower-speed peripheral buses of peripherals, such as USB, PCI or ISA buses.

The data storage device 818 may include a computer-readable storage medium 824 on which is stored instructions embodying any one or more of the methodologies of functions described herein, including but not limited to the method 200 of FIG. 2, the method 700 of FIG. 7, or the functions performed by the PRM module 600 of FIG. 6. The instructions may also reside, completely or at least partially, within the main memory 804 and/or within the processing device 802 during execution thereof by the computer system 800; the main memory 804 and the processing device 802 also constituting computer-readable storage media.

The computer-readable storage medium 824 may also be used to store instructions utilized by the processing device 112, such as described with respect to FIG. 1, and/or a software library containing methods that call the above applications. While the computer-readable storage medium 824 is shown in an example embodiment to be a single medium, the term "computer-readable storage medium" or, simply, "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "forwarding", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of any future presented claims. Accordingly, the specification and drawings are to be regarded in an illustrative sense rather than a restrictive sense. The scope of the invention should, therefore, be determined with reference to any future claims, along with the full scope of equivalents to which such claims are entitled.

What is claimed is:

1. A method comprising:
   providing a data structure in a memory;
   compiling player activity data into the data structure comprising a plurality of player entries, each of the plurality of player entries associating a player with a set of activity data points having a first value and a second value, wherein the first value indicates a time a player has played a particular game and the second value indicates an amount the player has played the particular game during the time;
   receiving, after compiling the player activity into the data structure, a query specifying an amount threshold over a first time range and a second time range, wherein the first time range and the second time range of the query are associated with the first values of the set of activity data points, and the amount threshold is associated with the second values of the set of activity data points;

determining the first time range and the second time range of the query as a dynamically quantifiable and searchable predicate value of the data structure; and searching the compiled data structure to determine a player entry associated with a subset of second activity data points satisfying the amount threshold based on the first values and the second values associated with the subset of second activity data points, wherein searching the compiled data structure comprises determining a plurality of players associated with a respective plurality of subsets of activity data points having first values and second values associated with the subset of second activity data points, wherein each of the subsets of activity data points comprises a time indicator indicating a time within a time window and wherein the subsets of activity data points comprises a set of amount indicators indicating a set of amounts having a sum within an amount window, wherein the plurality of player entries comprises:

a first player entry associating a first player with a first set of activity data points comprising zero activity data points;

a second player entry associating a second player with a second set of activity data points comprising a single activity data point; and a third player entry associating a third player with a third set of activity data points comprising a plurality of activity data points;

sending a response to the query comprising a player identifier associated with the determined player entry.

2. The method of claim 1, wherein each of the plurality of player entries further associates the player with a respective set of player data, each of the set of player data comprising at least one of an age indicator indicating an age of the player, a gender indicator indicating a gender of the player, a country indicator indicating a country of the player, or a username indicator indicating a username of the player.

3. The method of claim 1, wherein a subset of activity data points comprises each of the set of activity data points having first values in the first range.

4. A system comprising:
a memory to store an event data structure, the event data structure associating each of a plurality of user indicators with a respective set of event data points, each of the set of event data points comprising a time indicator and an amount indicator; and a processing device coupled to the memory, the processing device to:
receive event data regarding a plurality of events, the data indicating, for each of the events, a user associated with the event, a time associated with the event, and an amount the event has been accessed by the user;

generate the event data structure based on the event data;

receive a query specifying an amount threshold over a first time range and a second time range, wherein the first time range and the second time range of the query are associated with a first value of the set of event data points, and the amount threshold is associated with a second value of the set of event data points;

determine, using the event data structure, one or more matching user indicators based on a time window and an amount window;

determine the first time range and the second time range of the query as a dynamically quantifiable and searchable predicate value of the event data structure;

search the event data structure to determine a player entry associated with a subset of second event data points satisfying the amount threshold based on the first values and the second values associated with the subset of second event data points, wherein searching the event data structure comprises determining a plurality of player entries associated with a respective plurality of subsets of event data points having first values and second values associated with the subset of second event data points, wherein each of the subsets of event data points comprises the time indicator indicating a time within the time window and wherein the subsets of event data points comprises a set of amount indicators indicating a set of amounts having a sum within the amount window, wherein the plurality of user indicators comprises:

a first user indicator associating a first player with a first set of event data points comprising zero event data points, a second user indicator associating a second player with a second set of event data points comprising a single event data point, a third user indicator associating a third player with a third set of event data points comprising a plurality of event data points, and send a response to the query, the response comprising the matching user indicators.

5. The system of claim 4, wherein the query requests a list of user indicators indicating users that have played a particular game at least a threshold number of times within the time window.

6. The system of claim 5, wherein the at least a threshold number of times is at least once and the time window is a recent time period.

7. The system of claim 4, wherein the query requests a list of user indicators indicating users that have spent at least a threshold amount of money within the time window.

8. The system of claim 4, wherein the query further defines user data criteria and wherein the matching user indicators indicate users matching the user data criteria.

9. The system of claim 4, wherein each of the matching user indicators is associated by the data structure with a respective set of event data points having a subset of data points wherein each of the subset of data points comprises a time indicator indicating a time within the time window and wherein the subset of data points comprises a set of amount indicators indicating a set of amounts having a sum within the amount window.

10. A non-transitory computer-readable medium having instructions encoded thereon which, when executed by a processing device, causes the processing device to perform operations comprising:

receiving event data regarding a plurality of events, the data indicating, for each of the plurality of events, a user associated with the event, a time associated with the event, and an amount the event has been accessed by the user;

generating an event data structure based on the event data, the event data structure associating each of a plurality of user indicators with a respective set of event data points, each of the set of event data points comprising a time indicator and an amount indicator;

receiving a query specifying an amount threshold over a first time range and a second time range, wherein the first time range and the second time range of the query are associated with a first value of the set of event data points, and the amount threshold is associated with a second value of the set of event data points;

determining, by a processing device using the event data structure, one or more matching user indicators based on a time window and an amount window;

determining the first time range and the second time range of the query as a dynamically quantifiable and searchable predicate value of the event data structure;

searching the event data structure to determine a player entry associated with a subset of second event data points satisfying the amount threshold based on the first values and the second values associated with the subset of second event data points, wherein searching the event data structure comprises determining a plurality of players associated with a respective plurality of subsets of event data points having first values and second values associated with the subset of second event data points, wherein each of the subsets of event data points comprises a time indicator indicating a time within a time window and wherein the subsets of event data points comprises a set of amount indicators indicating a set of amounts having a sum within the amount window, wherein the plurality of user indicators comprises:

a first user indicator associating a first player with a first set of event data points comprising zero event data points, a second user indicator associating a second player with a second set of event data points comprising a single event data point, a third user indicator associating a third player with a third set of event data points comprising a plurality of event data points, and sending a response to the query, the response comprising the matching user indicators.

11. The non-transitory computer-readable medium of claim 10, wherein the query requests a list of user indicators indicating users that have played a particular game at least a threshold number of times within the time window.

12. The non-transitory computer-readable medium of claim 10, wherein the query requests a list of user indicators indicating users that have spent at least a threshold amount of money within the time window.

13. The non-transitory computer-readable medium of claim 10, wherein the event data structure further associates each of the plurality of user indicators with a respective set of user data, each of the set of user data comprising at least one of an age indicator indicating an age of the user, a gender indicator indicating a gender of the user, a country indicator indicating a country of the user, or a username indicator indicating a username of the user.

14. The non-transitory computer-readable medium of claim 10, wherein the query further defines user data criteria and wherein the matching user indicators indicate users matching the user data criteria.

* * * * *